Nov. 11, 1930.  E. H. BRISTOL  1,781,212
MEASURING INSTRUMENT
Filed Sept. 10, 1927
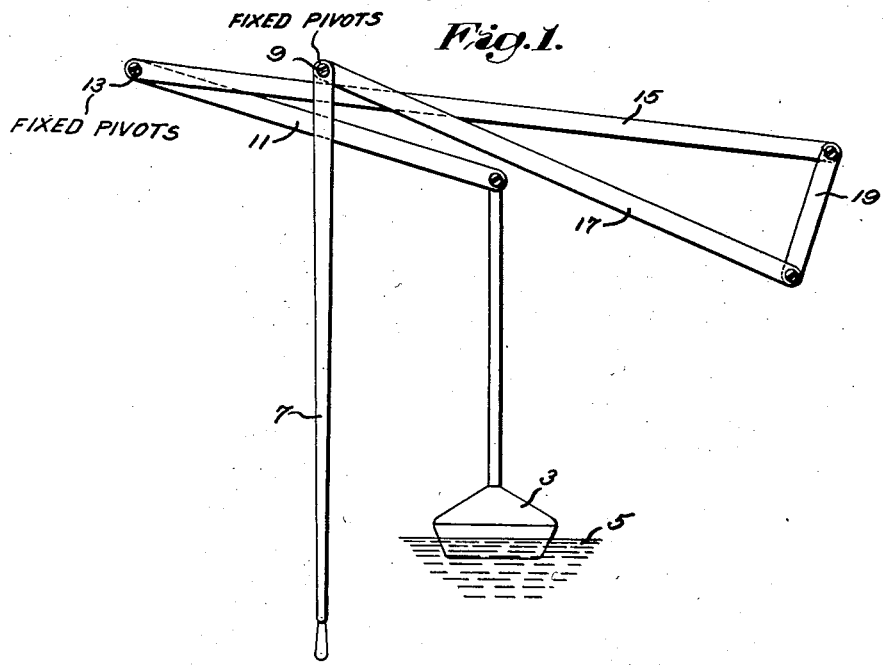
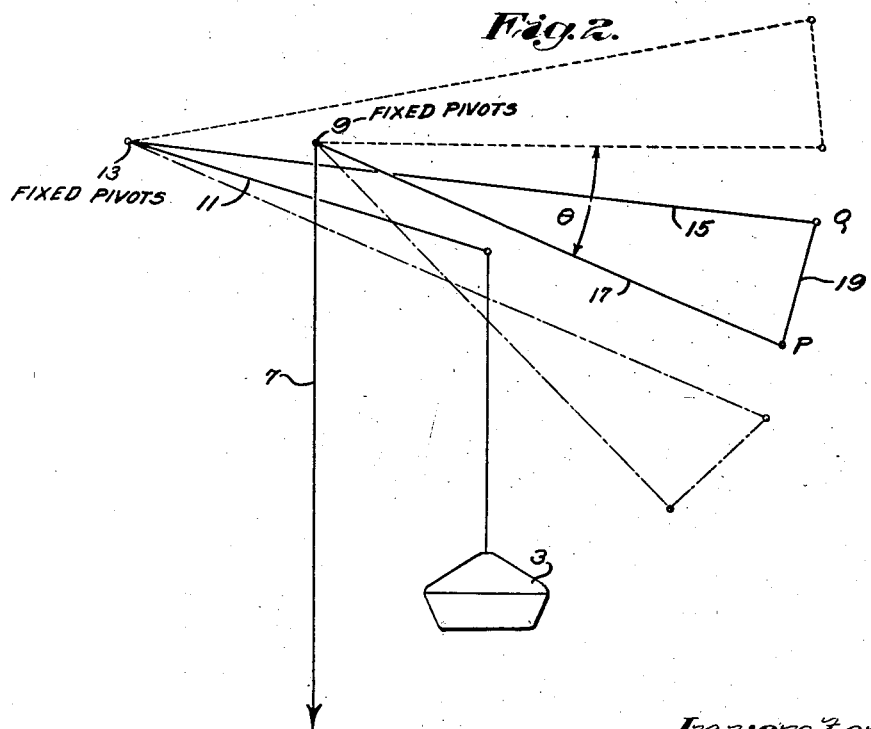
Inventor:
Edgar H. Bristol,
Emery, Booth, Janney & Varney
Attys.

Patented Nov. 11, 1930

1,781,212

UNITED STATES PATENT OFFICE

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS

MEASURING INSTRUMENT

Application filed September 10, 1927. Serial No. 218,603.

This invention relates to measuring instruments which are responsive to the fluctuations of some variable and in particular to those in which the responsive mechanism moves linearly in accordance with the changes in value of the variable. The object of the invention is to provide in such an instrument, wherein it is desired to transmit the movement of the responsive mechanism to a rotating shaft or arm, suitable means whereby the angular movement of the driven element is proportional to the linear movement of the measuring device.

My invention will be well understood by reference to the following description of an illustrative example thereof taken in connection with the accompanying drawings, wherein:

Fig. 1 is a front elevation of such portions of a recording pressure gage of the float type as are required to illustrate the invention; and Fig. 2 is a similar diagrammatic view indicating the parts in several positions.

A recording pressure gage is a familiar example of measuring instrument in connection with which I have chosen to illustrate my invention although it will be understood that the invention is applicable also to indicating and controlling instruments. In gages of the type commonly used in connection with orifice meters, such, for example, as that shown in the patent to E. H. Bristol, No. 1,592,415, dated July 13, 1926, a metal float 3 rests on a body of mercury 5 and reciprocates vertically in accordance with changes in the level of the mercury corresponding to variations in the pressure to which it is subjected. It will be understood that the movement of the float 3 is directly proportional to the pressures. The pressures are recorded on a suitable rotating polar chart (not shown) by means of a pen 7 swinging on a shaft or center 9 adjacent the periphery of the chart. The linear movement of the float is most conveniently transformed to rotative movement by attaching the float to a crank 11 on a shaft 13. It will be obvious, however, that the linear movement of the float is proportional to the sines of the angle of displacement of the shaft 13 and if the shaft 13 were used as a pen shaft, as in the common type of instrument, equal increments of movement of the float corresponding to equal increments of pressure would not produce equal movements of the pen. In accordance with my invention I provide a suitable linkage between the crank driven shaft and the pen shaft whereby movement of the pen is proportional to movement of the float with sufficient accuracy for commercial purposes and in particular a linkage embodying solely fixed rotative joints or connections as distinguished from connections involving a sliding movement of one part on another. Such a linkage may be easily and accurately made, operates without undue friction or danger of binding and is not likely to get out of order.

In the embodiment of the invention shown in Fig. 1 the pen shaft 9 is disposed in horizontal alignment with the shaft 13 and is driven therefrom by means of a linkage of the type commonly known as a drag link embodying a driving link 15 which turns with the shaft 13 and a driven link 17 in fixed angular relation to the pen 7 and swinging therewith, the two being united by the short connecting rod 19 pivotally attached to the two links at fixed points along their length, the distance between the fixed centers 9 and 13 corresponding to the fourth or fixed link of the ideal four bar linkage. The parts are so proportioned that the angular movement of link 17 about the center 9 and consequently of the pen 7 is approximately in fixed ratio to the linear movement of the float throughout the range of the instrument, this range in the ordinary case corresponding to an arc of swing of the pen 7 of about 45° or less.

Referring to Fig. 2, I have there shown the position of the links in their two extremes of movement in dotted lines and in dot and dash lines respectively and in full lines in a median position, which for purposes of analysis may be considered any given position of the linkage. The problem would be solved with theoretical accuracy if it were possible to make the angle $\theta$ through which the link 17 moves proportional to the sine of the angular displacement of the crank 11.

Obviously, however, since the center 9 is fixed the point P moves through the arc of a circle and cannot follow the theoretically accurate curve. The circle and the curve may, however, be made to coincide at suitable points and by a proper proportioning of the parts the deviation of the circle from the theoretical curve throughout the limited range of the instrument may be made to show a very small percentage error.

The subject lends itself to mathematical analysis and it is possible to derive an equation for the point Q at the extremity of the link 15 and by methods of the calculus impose conditions whereby this equation will be a true circular arc and thus arrive at the expression for the radius of curvature, herein represented by the link 15, which may be calculated for isolated points in the range of the instrument. The problem may also be approached in other ways. The expressions obtained are complex and it will be obvious that they will involve a number of constants, such as the lengths of the links 17 and 19 and the angle between link 15 and crank 11, which subject to certain relations among themselves are to a degree arbitrary. I shall therefore not attempt to state any of the mathematical analyses herein. In the practical design of an instrument, however, such analyses may be utilized in connection with empirical and experimental methods as a guide therefor and a check thereon.

An instrument practically embodying my invention may be constructed by taking the length of the link 17 proportional to 4.00, the length of the connecting rod 19 proportional to 1.00, the length of the driving link 15 proportional to 5.53 and the distance between the centers of the shafts 9 and 13 proportional to 1.53. The drawings hereto annexed are approximately to scale. The position of the crank 11 may be such that when it is horizontal the link 17 is substantially a continuation of the line of centers; that is, 9, 13 and P lie in the same straight line and conveniently, as shown, the crank 11, the link 17 and the line of centers may all lie in the same horizontal plane. With this arrangement of parts the instrument is designed to operate from an extreme position with the link 15 substantially horizontal as indicated in dotted lines in Fig. 2 downwardly into the fourth quadrant through an arc of approximately 45° to the dot and dash position. If the parts are permitted to swing in counterclockwise direction up beyond the dotted line position, the error increases very rapidly but for the range shown between the dotted line position and the dot and dash position the movement of the pen 7 is very closely directly proportional to the movement of the float 3.

I have described in detail one particular embodiment of my invention representing the best way now known to me by which it may be practically applied. It will be understood, however, that my invention is not limited to this particular arrangement, proportion and correlation of parts, but on the contrary comprehends other structures coming within the scope of the appended claims.

Claims:

1. In an instrument of the class described a responsive device having a linear movement, a shaft crank driven thereby, a swinging arm the movement of which renders available the action of said device, and a linkwork connection for moving the arm on rotation of said shaft the joints of which are solely of the rotating or pivotal type, the elements of the linkwork being correlated and relatively proportioned to effect an angular displacement of such arm in approximately fixed ratio to the sine of the displacement of such crank throughout the range of the instrument.

2. In an instrument of the class described, in combination with a driven element having a rotative movement the sine of the angular displacement of which is proportional to the value of the variable which is measured, a swinging arm the movement of which renders available the action of said device and a linkwork between said element and arm comprising a driving link rotating with the said element, a driven link swinging with the said arm and a connecting rod between said links pivoted thereto at fixed points, said parts being correlated and relatively proportioned to effect an angular displacement of said arm in approximately fixed ratio to the sine of the angular displacement of said driven element and thus in approximately direct proportion to the values of the variable throughout the range of the instrument.

3. In an instrument of the class described, in combination with a driven element having a rotative movement the sine of the angular displacement of which is proportional to the value of the variable which is measured, a swinging arm the movement of which renders available the action of said device, and a linkwork between said element and arm comprising a driven link swinging with the latter from a position substantially colinear with the line of centers of said element and arm through a limited arc, a connecting rod pivoted thereto at one end, a driving link rotating with said element to which the other end of said rod is pivoted, said parts being correlated and relatively proportioned to effect an angular displacement of said arm in approximately fixed ratio to the sine of the angular displacement of said driven element and thus in approximately direct proportion to the values of the variable throughout the range of the instrument.

4. In an instrument of the class described, in combination with a driven element having a rotative movement the sine of the angular displacement of which is proportional to the value of the variable which is measured, a swinging arm the movement of which renders available the action of said device, and a drag-link mechanism between said element and arm comprising a driven link swinging with the latter through a limited arc and at one extreme of its movement substantially colinear with the line of centers of said element and arm, a driven link turning with said element and a connecting rod pivoted to said links, the lengths of said last recited three elements and the line of centers being substantially in the ratio 4.00; 5.53; 1.00 and 1.53.

5. In an instrument of the class described, in combination with a driven element having a rotative movement the sine of the angular displacement of which is proportional to the value of the variable which is measured, a swinging arm the movement of which renders available the action of said device, and links between said element and arm defining with the line of centers thereof a four bar linkage, the connections between the elements thereof being of the pivotal type solely, the elements of said linkage being correlated and relatively proportioned to effect an angular displacement of said arm in approximately fixed ratio to the sine of the angular displacement of said driven element and thus in approximately direct proportion to the values of the variable throughout the range of the instrument.

6. In a device of the class described, a linkage comprising a plurality of interconnected swinging links pivoted to swing about spaced fixed centers, said swinging links being connected by fixed length link means pivoted thereto, said connected links differing in effective length by an amount substantially equal to the spacing of their fixed centers, and the first and last of said swinging links having relative angular motions substantially in accordance with the relationship $K \sin \theta = \phi$ radians, where $\theta$ and $\phi$ are the angles moved by the said first and last swinging links respectively and K is a constant of proportionality.

7. In a device of the class described, a linkage comprising a plurality of interconnected swinging links pivoted to swing about spaced fixed centers, said swinging links being connected by fixed length link means pivoted thereto, the distance between the points of said last named pivotal connections and the fixed center for the respective links determining the effective lengths of said respective links, said connected links differing in effective length by an amount substantially equal to the spacing of their fixed centers, and the first and last of said swinging links having relative angular motions substantially in accordance with the relationship $K \sin \theta = \phi$ radians, where $\theta$ and $\phi$ are the angles moved by the said first and last links respectively, and K is a constant of proportionality.

8. A device of the class described comprising a plurality of interconnected swinging links pivoted to swing about spaced fixed centers, said swinging links being connected by fixed length link means pivoted thereto, said connected links differing in effective length by an amount substantially equal to the spacing of their fixed centers, the first and last of said swinging links having relative angular motions substantially in accordance with the relationship $K \sin \theta = \phi$ radians, where $\theta$ and $\phi$ are the angles moved by the said first and last swinging links respectively and K is a constant of proportionality, means rendering available the action of said device operated by the said last swinging link, and means having a rotative movement the sine value of the angular displacement of which is substantially proportional to the value of the variable which is measured connected to operate said first swinging link.

In testimony whereof, I have signed my name to this specification.

EDGAR H. BRISTOL.